United States Patent [19]

Kameda

[11] Patent Number: 5,261,748
[45] Date of Patent: Nov. 16, 1993

[54] STRUCTURE FOR BUSHING

[75] Inventor: Masanao Kameda, Chiba, Japan

[73] Assignee: Kinugawa Rubber Ind. Co., Ltd., Chiba, Japan

[21] Appl. No.: 857,245

[22] Filed: Mar. 25, 1992

[30] Foreign Application Priority Data

Mar. 29, 1991 [JP] Japan .................................. 3-66176

[51] Int. Cl.$^5$ ..................... F16C 27/06; B60G 11/22
[52] U.S. Cl. ................................... 384/222; 267/141; 267/292
[58] Field of Search ..................... 384/215, 220-222; 267/292, 293, 141, 141.1; 403/228; 280/716, 717

[56] References Cited

U.S. PATENT DOCUMENTS

| | | | |
|---|---|---|---|
| 4,671,678 | 6/1987 | Münch | 384/222 X |
| 5,062,654 | 11/1991 | Kakimoto et al. | 267/293 X |
| 5,069,431 | 12/1991 | Kakimoto et al. | 403/228 X |
| 5,100,114 | 3/1992 | Reuter et al. | 267/293 |

FOREIGN PATENT DOCUMENTS

| | | |
|---|---|---|
| 0186315 | 7/1986 | European Pat. Off. |
| 3800314 | 7/1989 | Fed. Rep. of Germany |
| 62-49033 | 3/1962 | Japan |
| 1-105032 | 4/1989 | Japan |
| 2202923 | 10/1988 | United Kingdom |

Primary Examiner—Thomas R. Hannon
Attorney, Agent, or Firm—Bachman & LaPointe

[57] ABSTRACT

A structure for a bushing disposed between inner and outer cylindrical members arranged concentrically to each other, comprises an elastical member fitted into the inner periphery of the outer cylindrical member, a substantially cylindrical slidable member disposed between the inner cylindrical member and the elastical member, and a projecting lip portion formed on at least one of the outer circumferential surface of the inner cylindrical member and the inner circumferential surface of the slidable member, such that the projecting portion keeps in contact with the opposing circumferential surface with a small contact area and defines a slight aperture between the outer periphery of the inner cylindrical member and the inner periphery of the slidable member.

6 Claims, 3 Drawing Sheets

STRUCTURE FOR BUSHING

BACKGROUND OF THE INVENTION

1. Field of the Invention

The present invention relates to a structure for a bushing utilized at a connecting portion between a suspension member and a vehicular body of an automotive vehicle, and specifically to a slide bushing structure which permits a smooth movement of a suspension member with regard to the vehicle body, while efficiently absorbing a portion of road shock transmitted from the road wheel to the suspension member.

2. Description of the Prior Disclosure

As is generally known, various bushings are used at connecting portions of linkages utilized in automotive suspension systems. For example, a slide bushing is provided in a connecting portion between an upper control arm (upper suspension arm) of a double wishbone type independent front suspension system and a vehicle body, so as to permit a smooth pivoting movement of the upper control arm pivotably supported on the car frame by way of an inner support shaft. Such conventional bushing structures have been disclosed in Japanese Patent First Publication (Tokkai) Heisei 1-105032 and Japanese Utility Model First Publication (Jikkai) Showa 62-49033.

As shown in FIG. 1, a conventional bushing assembly 1 includes an inner cylindrical member 3 fitted onto the outer periphery of an inner support shaft 2, an outer cylindrical member 4 concentrically arranged with the inner cylindrical member 3, a cylindrical elastic member 5 disposed between the inner and outer cylindrical members 3 and 4 in close proximity to the inner periphery of the outer cylindrical member 4, and a rotatable member 6 disposed between the elastic member 5 and the inner cylindrical member 3 so that the inner periphery of the elastic member 5 is fitted onto the outer periphery of the rotatable member 6. Traditionally, the elastic member 5 is made of a rubber material, while the rotatable member 6 is made of a synthetic resin. As clearly seen in FIG. 1, a substantially cylindrical aperture 7 is defined between the inner peripheral surface 6a of the rotatable member 6 and the outer peripheral surface 3a of the inner cylindrical member 3. Such a slight aperture 7 is effective to provide a smooth rotational movement of the rotatable member 6 with respect to the inner cylindrical member 3. In order to achieve a properly high rigidity of the bushing assembly in its radial direction, the elastic member 5 is not soft but hard. The properly high rigidity of the bushing is effective to absorb input vibration acting in the radial direction of the support shaft 2. In the above noted conventional bushing structure, assuming that the inner peripheral surface of the rotatable member 6 is fitted onto the outer peripheral surface of the inner cylindrical member 3 without providing a slight aperture 7 between the two members 6 and 3 and in addition the rigidity of the bushing is high, the elastical member 5 would serve as a torsional spring having a relatively high torsional rigidity. This prevents a smooth pivoting movement of the upper control arm of the double wishbone type suspension system. For this reason, it is important to provide a proper aperture 7 between two members, namely an inner support shaft 3 and a rotatable member 6. However, when the vehicle travels on a bumpy road and the bushing receives a relatively great input vibration transmitted through the outer cylindrical member 4, the conventional bushing having the above aperture 7 experiences a great hammering noise created due to cyclical collisions occurring between the outer peripheral surface 3a of the inner cylindrical member 3 and the inner peripheral surface 6a of the rotatable member 6.

SUMMARY OF THE INVENTION

It is, therefore in view of the above disadvantages, an object of the present invention to provide an optimal structure for a bushing provided between two members which structure is capable of preventing hammering noise created due to input vibrations acting in the radial direction of the bushing, while permitting a smooth pivotal movement of one member with regard to the other member.

It is another object of the invention to provide an optimal structure for a bushing which structure is capable of providing a high durability of the bushing.

It is a further object of the invention to provide an optimal structure for a slide bushing for automotive vehicles, utilized in a connecting portion between a vehicle body and a suspension member suspending the vehicle body, which structure reliably permits a smooth pivoting movement of the suspension member with regard to the car frame, while absorbing a portion of road shock transmitted from the road wheel to the suspension member and preventing hammering noise occurring in the bushing due to input vibrations transmitted from the suspension member to the bushing.

In order to accomplish the aforementioned and other objects, a structure for a bushing disposed between inner and outer cylindrical members arranged concentrically to each other, comprises an elastical member fitted into the inner periphery of the outer cylindrical member, a substantially cylindrical slidable member disposed between the inner cylindrical member and the elastical member, and a projecting portion formed on at least one of the outer circumferential surface of the inner cylindrical member and the inner circumferential surface of the slidable member such that the projecting portion keeps in contact with the opposing circumferential surface. To provide the projecting portion, the slidable member may include a tapered surface section on the outer peripheral surface in the vicinity of the outer end thereof when disassembled. The tapered surface section functions as the projecting portion when assembled as a bushing unit.

According to another aspect of the invention, a structure for a slide bushing disposed between an inner cylindrical member fitted onto the outer periphery of an inner support shaft for a control arm of a double wishbone type independent suspension system for automotive vehicles and an outer cylindrical member concentrically arranged with the inner cylindrical member, comprises an elastical member fitted into the inner periphery of the outer cylindrical member, a reinforcing sleeve press-fitted into the inner periphery of the elastical member, a substantially cylindrical slidable member disposed between the inner cylindrical member and the reinforcing sleeve, and a projecting lip portion formed on at least one of the outer circumferential surface of the inner cylindrical member and the inner circumferential surface of the slidable member such that the projecting lip portion keeps in contact with the opposing circumferential surface with a small contact area and defines a slight aperture between the outer periphery of the inner cylindrical member and the inner periphery of the slidable member. The projecting lip portion is a substantially semi-spherical shape in cross-section to provide the small contact area. The projecting lip portion is continuously or discontinuously formed on at least one of the outer circumferential surface of the inner cylindrical member and the inner circumferential surface of the slidable member so as to keep a slightly pressurized contact state wherein the projecting lip portion constantly mates the opposing circumferential surface with the small contact area. The elastical member may have an inner curved end keeping in contact with the outer peripheral surface of the inner cylindrical member in an air tight fashion so as to prevent dust from being introduced into the interior of the slide bushing and to provide a reliable sealing of the inner end of the bushing.

DESCRIPTION OF THE PREFERRED EMBODIMENTS

Figure 1:
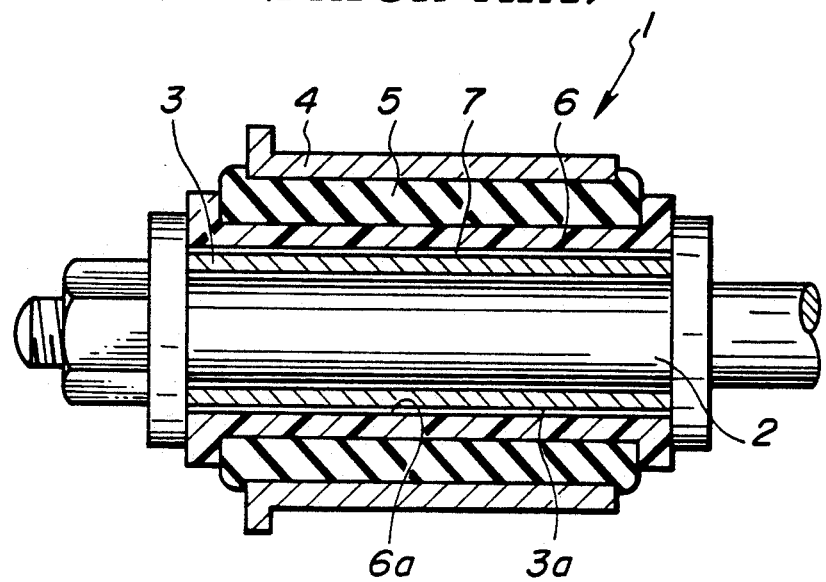
FIG. 1 is a longitudinal cross sectional view illustrating an essential part of a prior art bushing assembly utilized in a connecting portion between a vehicle body and a suspension member.
Figure 2:
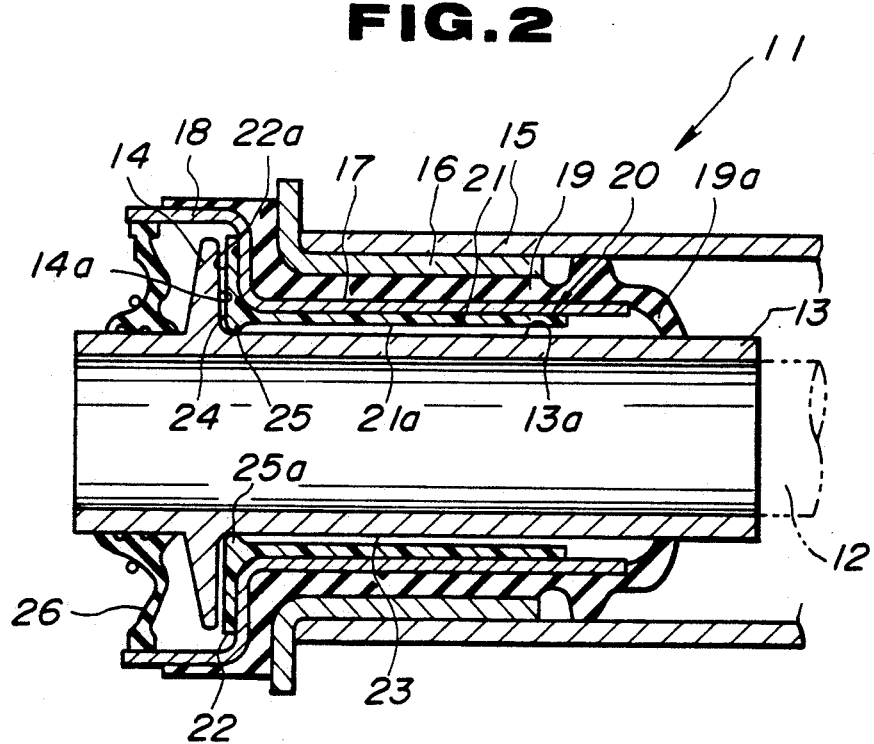
FIG. 2 is a longitudinal cross sectional view illustrating a left half sub-assembly of a slide bushing assembly of a first embodiment according to the invention.
Figure 3:
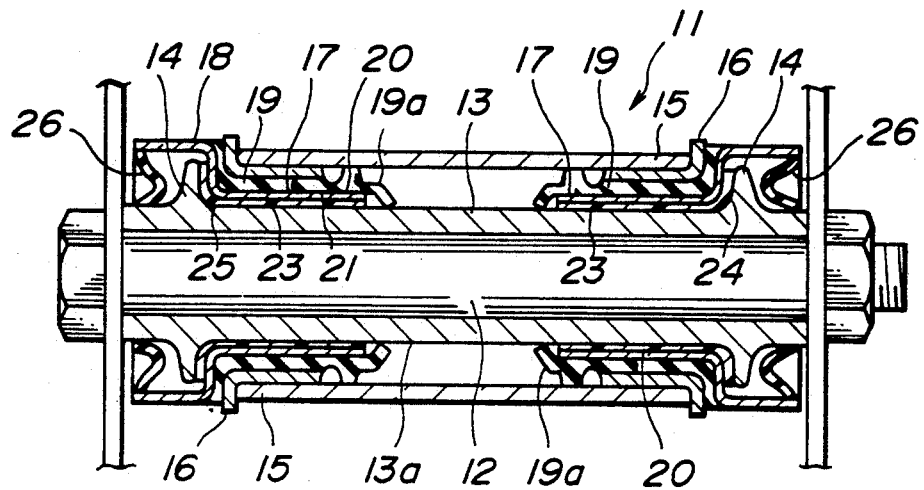
FIG. 3 is a longitudinal cross sectional view illustrating a pair of slide bushings of the first embodiment, provided in a connecting portion between a car frame and a suspension member of a double wishbone type independent front suspension system for automotive vehicles.

Referring now to the drawings and particularly to FIGS. 2 and 3, there is shown an improved structure for a bushing of the first embodiment, utilized in a connecting portion between a car frame and an upper control member of a double wishbone type independent front suspension member, for example. The bushing assembly 11 is a two-split type bushing and is comprised of a pair of bushing sub-assemblies having the same geometry to each other as shown in FIG. 3. FIG. 2 shows a left half sub-assembly of the bushing assembly 11. As seen in FIG. 2, the left bushing sub-assembly includes an inner cylindrical member 13 fitted onto the outer periphery of an inner support shaft 12, a substantially cylindrical retainer 16 fitted into an outer cylindrical member 15 which is concentrically arranged with the inner cylindrical member 13 and extended over the left and right bushing sub-assemblies, an elastical member 19 provided between the retainer 16 and the inner cylindrical member 13 so as to provide a flexible coupling between the car frame and the suspension member, a sleeve 17 fitted into the inner periphery of the elastical member 19 so as to serve as a reinforcement provided to enhance an entire rigidity of the bushing, and a slidable and rotatable member 20 disposed between the inner cylindrical member 13 and the sleeve 17 in such a manner as to be press-fitted into the sleeve 17. The retainer 16 is press-fitted into the one end of the outer cylindrical member 15 until a radially extending bended portion of the retainer 16 abuts with the end of the outer cylindrical member 15. The sleeve 17 is a cranked shape in cross-section and includes a large diameter portion 18 at its left end (viewing FIG. 2), a small diameter portion, and a radially extending intermediate cranked portion located between the large and small diameter portions. As seen in FIG. 2, the outer end of the elastical member 19 is sandwiched between the bended portion of the retainer 16 and the cranked portion of the sleeve 17 in an air tight fashion, while the inner end of the elastical member 19 is inwardly and radially curved in such a manner as to cover the inner end of the small diameter portion of the sleeve 17. The curved inner end of the elastical member 19 comes into contact with the outer peripheral surface 13a of the inner cylindrical member 13 in an air tight fashion so as to prevent dust from being introduced into the interior of the bushing and to provide a reliable sealing action. The inner cylindrical member 13 is formed with a flange 14 in the vicinity of the outer end thereof. The retainer 16 is fitted into the outer cylindrical member 15 such that the bended portion of the retainer 16 reaches the end of the outer cylindrical member 15. The elastical member 19 is made of rubber material, while the slidable member 20 is made of synthetic resin. The slidable member 20 includes an axially extending cylindrical portion 21 press-fitted into the small diameter portion of the sleeve 17 and an annular portion 22 extending radially along the cranked portion of the sleeve 17. With the above arrangement, the bushing 11 is rotatable around the inner cylindrical member 13 and slightly slidable in the axial direction of the member 13 with distortion of the elastical member 19.

As clearly shown in FIG. 2, a cylindrical hollow or aperture 23 is defined between the inner peripheral surface 21a of the cylindrical portion 21 of the slidable member 20 and the outer peripheral surface 13a of the inner cylindrical member 13, while providing a radially extending aperture 24 defined between the outer end surface 22a of the annular portion 22 and the inner end surface 14a of the flange 14 of the inner cylindrical member 13.

The bushing 11 of the first embodiment also includes a substantially annular, inwardly projecting portion 25 circumferentially extending from the inner peripheral surface 21a in the vicinity of the inner periphery of the annular portion 22, such that the projecting portion 25 keeps in contact with the outer peripheral surface 13a of the inner cylindrical member 13 in the vicinity of the flange 14. The projecting portion 25 is a substantially semi-spherical shape in cross-section. The projecting portion 25 has a circumferential lip formed with an inner peripheral, spherical surface 25a. The cross-sectional dimension of the projecting portion 25 is determined so that the spherical surface 25a of the lip constantly mates with the outer peripheral surface 13a of the inner cylindrical member 13 in a slightly pressurized contact state wherein the circumferential lip constantly mates the opposing outer peripheral surface 13a of the inner cylindrical member 13 with a small contact area. The slightly pressurized contact will be hereinafter referred to as a "line contact". In FIGS. 2 and 3, reference numeral 26 denotes a sealing member necessary to seal off the apertures 23 and 24 from the exterior of the bushing.

As will be appreciated from the above, since the slide bushing structure of the first embodiment can provide a continuous line contact between the lip portion of the slidable and rotatable member 20 and the outer periphery of the inner cylindrical member 13, while providing a substantially cylindrical hollow or aperture defined between the two members 13 and 20, the previously noted hammering noise is reliably prevented. As seen in FIG. 3, since the above noted lip of the projecting portion 25 is provided in close proximity to the annular portion 22 easily affected by the input vibrations transmitted through the outer cylindrical member 15, such a location of the lip of the projecting portion 25 is highly effective to suppress hammering noise. Moreover, since the spherical surface of the projecting portion 25 mates with the opposing outer peripheral surface of the inner cylindrical member 13 in a line contact state, the slide bushing structure of the first embodiment can reduce frictional resistances against both rotational movement and sliding movement of the member 20, thereby resulting in a smooth rotational or sliding movement of the bushing 11 with respect to inner support shaft 12.

Figure 4:
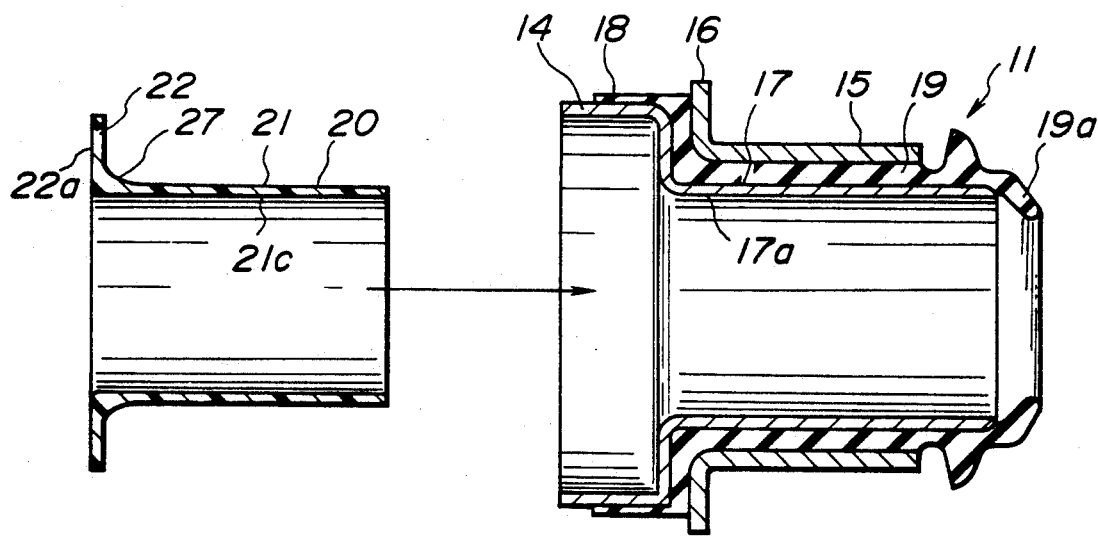
FIG. 4 is a disassembled view illustrating a slide bushing structure of a second embodiment according to the invention.

Referring now to FIG. 4, there is shown a disassembled slide bushing of the second embodiment. Basically, the bushing structure of the second embodiment is similar to that of the first embodiment. The same reference numerals used in the first embodiment shown in FIGS. 2 and 3 will be applied to the corresponding elements used in the second embodiment shown in FIG. 4, for the purpose of simplification of description.

The second embodiment is different from the first embodiment in that the slidable member 20 is not formed with a projecting portion 25 but with a slightly tapered thick section 27 on the outer periphery of the cylindrical portion 21 being in the vicinity of the annular portion 22. When assembled, i.e., the slidable member 20 is press-fitted into the sleeve 17 until the annular portion 22 and the cranked portion of the sleeve 17 abut to each other, the tapered section 27 is inwardly pressurized by the inner peripheral surface 17a of the sleeve 17, with the result that the aforementioned projecting portion 25 is easily formed in the tapered section 27 of the slidable member 20.

Figure 5:
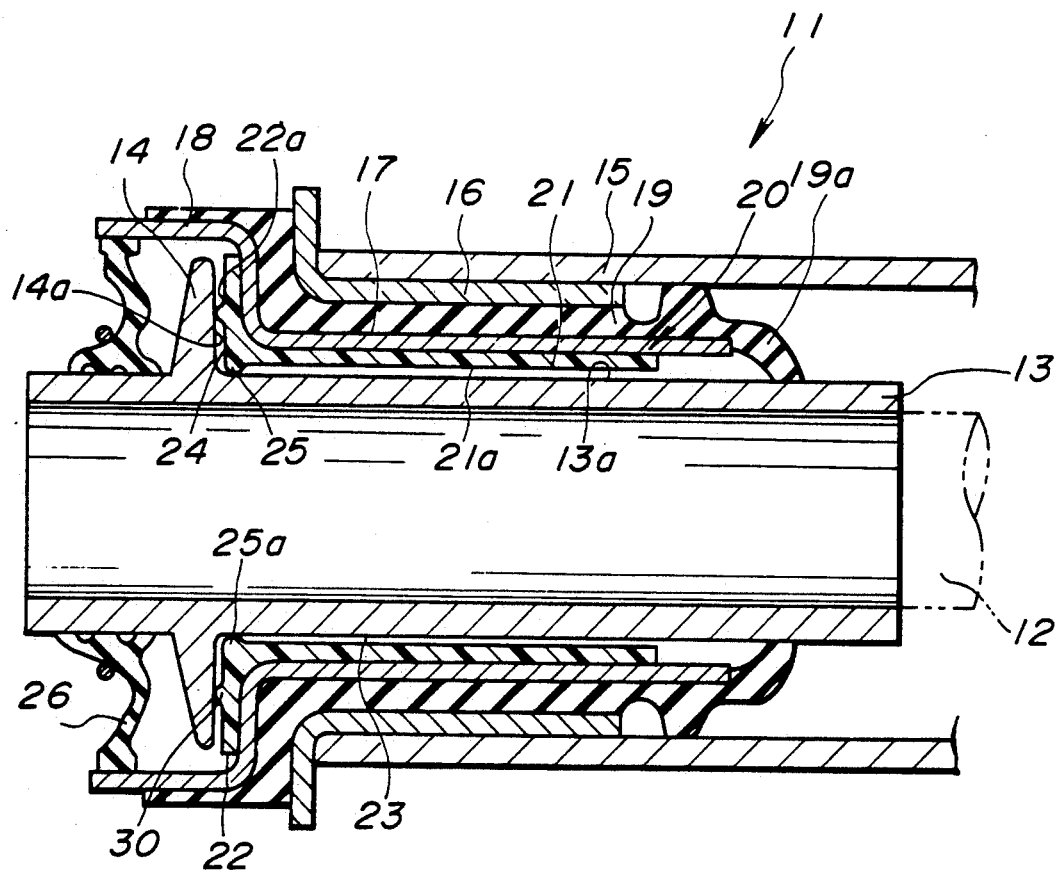
FIG. 5 is a longitudinal cross sectional view illustrating a slide bushing structure of a third embodiment similar to the first embodiment of FIGS. 2 and 3.

Referring now to FIG. 5, there is shown a slide bushing of the third embodiment. The bushing structure of the third embodiment is also similar to that of the first embodiment. The same reference numerals used in the first embodiment shown in FIGS. 2 and 3 will be applied to the corresponding elements used in the third embodiment shown in FIG. 5.

The third embodiment is different from the first embodiment in that another projecting portion 30 is formed on the outer end surface 22a of the annular portion 22 of the slidable member 22, in addition to the projecting portion 25 as detailed in the first embodiment. In the third embodiment, since the two projecting portions 25 and 30 are provided on the two planes 21a and 22a arranged in a substantially perpendicular directions, the bushing 11 is reliably supported on the inner cylindrical member 13, while keeping the line contact.

Although in the slide bushing structure of the preferred embodiments according to the invention, the projecting portion is formed on the slidable member 20, the projecting portion may be formed on the outer peripheral surface 13a of the inner cylindrical member 13 or on the inner end surface 14a of the flange 14, so as to provide a line contact between the bushing 11 and the inner cylindrical member 13.

In the preferred embodiments, although a sleeve 17 serving as a reinforcement is provided in a bushing sub-assembly, a slidable member 20 may be directly fitted into an elastical member 19 without providing the sleeve 17.

Furthermore, although the lip of the projecting portion 25 is continuously formed in the circumferential direction of the slidable member in the embodiments, the lip may be intermittently or discontinuously formed along the circumferential surface of the slidable member.

While the foregoing is a description of the preferred embodiments for carrying out the invention, it will be understood that the invention is not limited to the particular embodiments shown and described herein, but may include variations and modifications without departing from the scope or spirit of this invention as described by the following claims.

What is claimed is:

1. A structure for a bushing disposed between inner and outer cylindrical members arranged concentrically to each other, comprising:

an elastical member fitted into the inner periphery of said outer cylindrical member;

a substantially cylindrical slidable member disposed between said inner cylindrical member and said elastical member;

a projecting portion formed on at least one of the outer circumferential surface of said inner cylindrical member and the inner circumferential surface of said slidable member, such that said projecting portion keeps in contact with the opposing circumferential surface; and wherein said slidable member includes a tapered surface section on the outer peripheral surface in the vicinity of the outer end thereof when disassembled, and said tapered surface section functions as said projecting portion when assembled as a bushing unit.

2. The slide bushing structure as set forth in claim 1, wherein said projecting portion is a substantially semi-spherical shape in cross-section to provide a small contact area.

3. The slide bushing structure as set forth in claim 2, wherein said projecting portion is continuously or discontinuously formed on at least one of the outer circumferential surface of said inner cylindrical member and the inner circumferential surface of said slidable member so as to keep a slightly pressurized contact state wherein said projecting portion constantly mates the opposing circumferential surface with said small contact area.

4. The slide bushing structure as set forth in claim 1, wherein said elastical member has an inner curved end keeping in contact with the outer peripheral surface of said inner cylindrical member in an air tight fashion so as to prevent dust from being introduced into the interior of said bushing and to provide a reliable sealing of the inner end of said bushing.

5. A structure for a slide bushing disposed between an inner cylindrical member fitted onto the outer periphery of an inner support shaft for a control arm of a double wishbone type independent suspension system for automotive vehicles and an outer cylindrical member concentrically arranged with said inner cylindrical member, comprising:

an elastical member fitted into the inner periphery of said outer cylindrical member;

a reinforcing sleeve press-fitted into the inner periphery of said elastical member;

a substantially cylindrical slidable member disposed between said inner cylindrical member and said elastical member;

a projecting lip portion formed on at least one of the outer circumferential surface of said inner cylindrical member and the inner circumferential surface of said slidable member such that said projecting lip portion keeps in contact with the opposing circumferential surface with a small contact area and defines a slight aperture between the outer periphery of said inner cylindrical member and the inner periphery of said slidable member; and wherein said projecting lip portion is a substantially semi-spherical shape in cross-section to provide said small contact area.

6. The slide bushing structure as set forth in claim 5, wherein said projecting lip portion is continuously or discontinuously formed on at least one of the outer circumferential surface of said inner cylindrical member and the inner circumferential surface of said slidable member so as to keep a slightly pressurized contact state wherein said projecting lip portion constantly mates the opposing circumferential surface with said small contact area.

* * * * *